(12) United States Patent
Mitra et al.

(10) Patent No.: US 11,544,811 B2
(45) Date of Patent: Jan. 3, 2023

(54) IDENTIFYING A VEHICLE USING A WEARABLE DEVICE

(71) Applicant: Ford Global Technologies, LLC, Dearborn, MI (US)

(72) Inventors: Pramita Mitra, West Bloomfield, MI (US); Pietro Buttolo, Dearborn Heights, MI (US); Basavaraj Tonshal, Northville, MI (US); Qianyi Wang, Allen Park, MI (US); Gary Steven Strumolo, Canton, MI (US); Kelly Lee Zechel, Plymouth, MI (US); Brian Nash, Northville, MI (US); Theodore Wingrove, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 441 days.

(21) Appl. No.: 16/633,470

(22) PCT Filed: Jul. 31, 2017

(86) PCT No.: PCT/US2017/044612
§ 371 (c)(1),
(2) Date: Jan. 23, 2020

(87) PCT Pub. No.: WO2019/027411
PCT Pub. Date: Feb. 7, 2019

(65) Prior Publication Data
US 2020/0160474 A1    May 21, 2020

(51) Int. Cl.
*G06Q 50/30* (2012.01)
*G01S 3/04* (2006.01)
(Continued)

(52) U.S. Cl.
CPC .............. *G06Q 50/30* (2013.01); *G01S 3/043* (2013.01); *G01S 3/14* (2013.01); *G02B 27/017* (2013.01);
(Continued)

(58) Field of Classification Search
CPC .......... G06Q 50/30; G01S 3/043; G01S 3/14; G01S 3/04; G02B 27/017; G02B 27/022; G02B 2027/0178
See application file for complete search history.

(56) References Cited

U.S. PATENT DOCUMENTS 9,892,637 B2 * 2/2018 Demisse ................ G08G 1/017
10,839,684 B2 * 11/2020 Chase ............. B60W 60/00253
(Continued)

FOREIGN PATENT DOCUMENTS

| CN | 104992509 A | 10/2015 |
| CN | 105096587 A | 11/2015 |

(Continued)

OTHER PUBLICATIONS

International Search Report of the International Searching Authority for PCT/US2017/044612 dated Dec. 1, 2017.

*Primary Examiner* — Toan N Pham
(74) *Attorney, Agent, or Firm* — Brandon Hicks; Bejin Bieneman PLC (57) ABSTRACT

A system that includes a wearable device, and a method of using the system, including: receiving, at a first transceiver element of a wearable device, a target beam from a rideshare vehicle, the element having a first axis of reception; and when the first axis is oriented toward the beam, providing an indication, via the device, to a user thereof.

15 Claims, 9 Drawing Sheets

(51) Int. Cl.
  *G01S 3/14*  (2006.01)
  *G02B 27/01* (2006.01)
  *G02B 27/02* (2006.01)
(52) U.S. Cl.
  CPC .... G02B 27/022 (2013.01); *G02B 2027/0178* (2013.01)

(56) References Cited

U.S. PATENT DOCUMENTS

| | | |
|---|---|---|
| 2005/0088301 A1 | 4/2005 | Abbruscato |
| 2007/0176685 A1 | 8/2007 | Barksdale |
| 2014/0016800 A1 | 1/2014 | Dong et al. |
| 2015/0348408 A1 | 12/2015 | Demisse |
| 2017/0178269 A1* | 6/2017 | McKinnon ............. G06Q 50/30 |
| 2020/0334581 A1* | 10/2020 | Skaling ................ H04W 12/77 |

FOREIGN PATENT DOCUMENTS

| | | |
|---|---|---|
| CN | 105404929 A | 3/2016 |
| DE | 102012009820 A1 | 11/2012 |
| JP | 2003-268732 A | 9/2003 |
| JP | 2015098677 A | 5/2015 |
| KR | 20160014822 A | 2/2016 |
| WO | 2017/106497 A1 | 6/2017 |

\* cited by examiner

IDENTIFYING A VEHICLE USING A WEARABLE DEVICE

BACKGROUND

When hailing a taxi, a user may raise his or her hand to flag the attention of a taxi-driver. When the driver sees the user, the driver may pull his/her vehicle over and let the user into the vehicle, and thereafter, drive the user to his/her destination. In other instances, regardless of whether the driver sees the user, the driver may pass by the user—e.g., for a number of reasons, including that the driver is not available to taxi the user to his/her destination.

More recently, users can provide location information to a taxi driver via a handheld mobile device. Using that information, the taxi-driver may come to that location, wherein, once the vehicle arrives, the user may attempt to verify that the vehicle is in fact the requested taxi vehicle.

DETAILED DESCRIPTION

A communication system is described that includes a vehicle and a wearable device. The vehicle may comprise a wireless transceiver system for communicating with the wearable device and an indicator for providing an indication of the vehicle's identity to a user of the wearable device. According to one illustrative example, a method of using the communication system may include: receiving, at a first transceiver element of a wearable device, a target beam from a ride-share vehicle, the element having a first axis of reception; and when the first axis is oriented toward the beam, providing an indication, via the device, to a user thereof.

According to the at least one method example set forth above, the indication includes a light pattern that matches a light pattern emitted from the vehicle.

According to the at least one method example set forth above, the method further includes: prior to receiving the target beam, transmitting, from the transceiver, a ride-share request.

According to the at least one method example set forth above, the element operates in a V-band (57-71 GHz).

According to the at least one method example set forth above, the method further includes: receiving the target beam via a second transceiver element of the device, wherein the second transceiver element comprises a second, different axis of reception; and providing to the user a second indication which indicates a direction from which the target beam originates.

According to another illustrative example, a method may include: receiving at an antenna array on a vehicle a ride-share request from a wearable device having a wireless transceiver, wherein the request includes alert format data; using the array, determining an angle of arrival at a vehicle computer; and transmitting an alert to the device according to the data.

According to the at least one method example set forth above, the array may comprise a plurality of vehicle-forward-facing antennas, a plurality of vehicle-port-side-facing antennas, and a plurality of vehicle-starboard-side-facing antennas.

According to another illustrative example, a system may include: a wearable device, that may comprise: a first transceiver element having a first axis of reception; and a computer, comprising a processor and memory storing instructions executable by the processor, including to: receive, via the element, a target beam from a ride-share vehicle; and when the first axis is oriented toward the beam, provide an indication via the device to a user thereof.

According to the at least one example set forth above, wherein the device further may comprise an eyeglass frame carrying the element and computer, wherein the first axis corresponds with a mid-sagittal plane of the user's head.

According to the at least one example set forth above, the device further may comprise a projector which projects the indication toward an eye of the user.

According to the at least one example set forth above, the indication includes a light pattern provided by the device which matches a light pattern emitted from the vehicle.

According to the at least one example set forth above, the instructions further may comprise to: transmit a ride-share request, wherein receiving the target beam occurs in response to transmitting the request.

According to the at least one example set forth above, the instructions further may comprise to: transmit alert format data to the vehicle so that, using the data, the vehicle may identify itself to the user.

According to the at least one example set forth above, the element operates in a V-band (57-71 GHz).

According to the at least one example set forth above, wherein the device may comprise: a second transceiver element having a second axis of reception, wherein, with respect to the first transceiver element, the second transceiver element is spaced on the device laterally therefrom.

According to the at least one example set forth above, wherein the instructions further may include to: receive the target beam via the second transceiver element; and using the device, provide to the user thereof, a second indication which indicates to the user a direction from which the target beam originates.

According to the at least one example set forth above, wherein the instructions further may include to: after providing the second indication, determine when the first axis is oriented toward the beam; and in response to the determination, provide the first indication.

According to the at least one example set forth above, the system further may comprise: a computer onboard the vehicle comprising a second processor and second memory storing instructions executable by the second processor, the instructions may comprise to: receive a ride-share request from the device; and provide an alert in a direction from which the ride-share request was received.

According to the at least one example set forth above, wherein the instructions further may include to: broadcast the target beam from at least one of an array of transceiver elements on the vehicle; and then, receive the ride-share request in response to the broadcast.

According to the at least one example set forth above, the system further may comprise: a computer onboard the vehicle comprising a second processor and second memory storing instructions executable by the second processor, the instructions may comprise to: receive a ride-share request from a remote server; in a fully autonomous mode and based on the request, move the vehicle to a location of the user; and then provide an alert in at least one direction radially outwardly of the vehicle.

According to the at least one example, a computer is disclosed that is programmed to execute any combination of the examples set forth above.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the examples of the method(s) set forth above.

Figure 1:
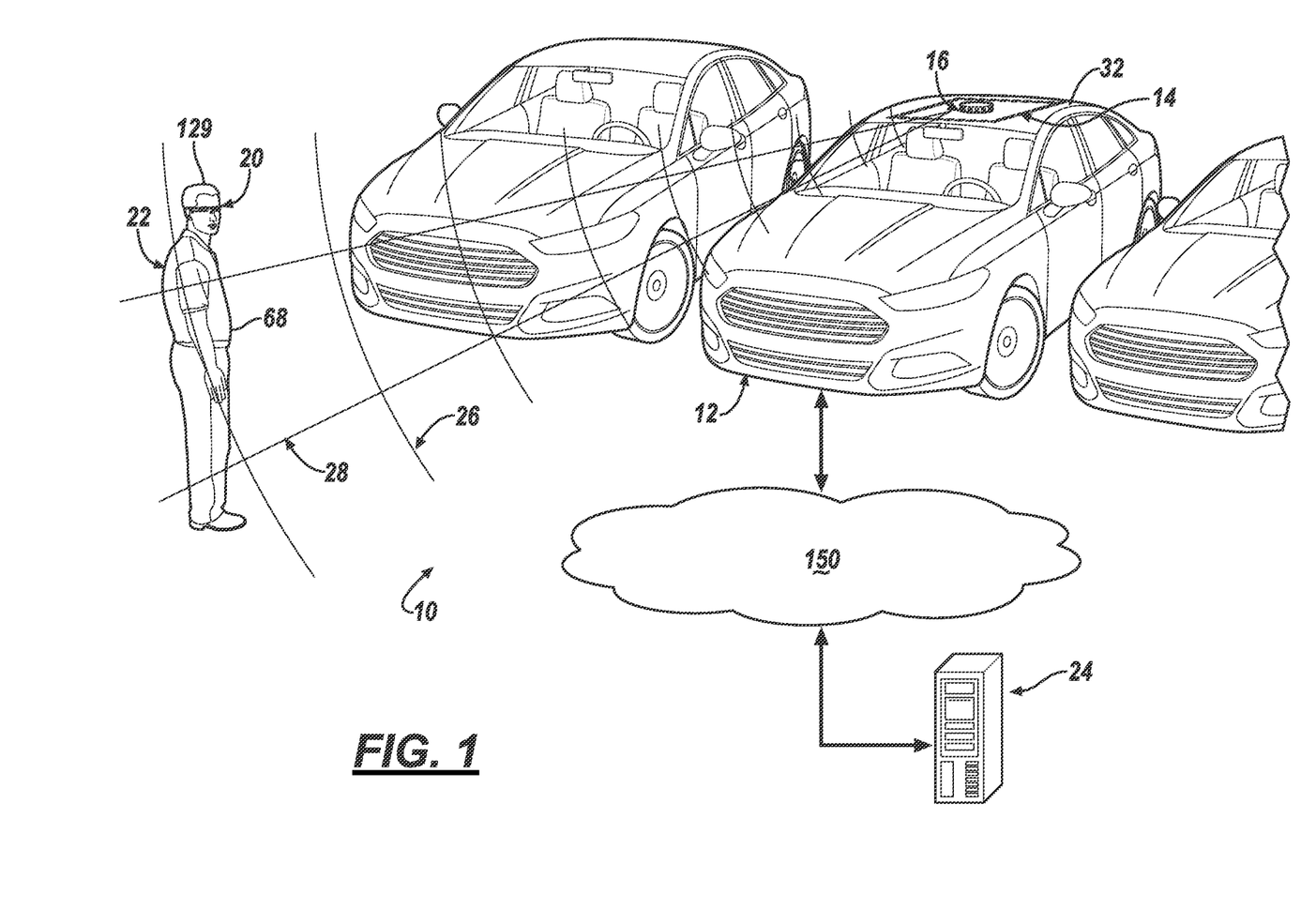
FIG. 1 is a perspective view of a communication system that includes a wireless transceiver system and an indicator (both for a vehicle) and a wearable device for a user.

Now turning to the figures, wherein like numerals indicate like parts throughout the several views, there is shown a communication system 10 that includes a vehicle 12 having a wireless transceiver system 14 and an indicator 16 (e.g., illustrated here as a multi-function lamp), a wearable device 20 worn by a user 22, and a backend or remote server 24 which may communicate with the user 22 and/or vehicle 12. The system 10 may be used by persons (e.g., such as user 22 wearing wearable device 20) to locate an available ride-share vehicle (e.g., such as vehicle 12). For example, the ride-share vehicle 12 may be a fully autonomous (e.g., driverless) taxi vehicle which picks up and respectively delivers users 22 to their desired destinations. According to one aspect of the system 10, when the user 22 seeks an autonomous taxi vehicle 12, the wearable device 20 receives a target beam 26 from the transceiver system 14 (of the vehicle 12) and uses that target beam 26 to locate a direction or angle of approach of the vehicle 12 (relative to the user 22), and thereafter orient the user 22 toward that direction. The vehicle 12 also may determine the direction of the user 22 (relative to the vehicle 12) and transmit a unique light pattern 28 generally aimed at the wearable device 20. The user 22—now facing the vehicle 12—may see the light pattern 28 and compare this light pattern to a corresponding light pattern displayed via the wearable device 20 in order to confirm the identity of the vehicle. For instance, when the user determines that the light pattern 28 is the same as the light pattern displayed by the wearable device 20, then the user may determine that the vehicle 12 transmitting this light pattern 28 is indeed his/her requested ride-share vehicle. This is merely one example of how user 22 may locate the requested vehicle 12 using the communication system 10. Other examples will be described more below.

Referring to FIGS. 1-5, the vehicle 12 is shown as a passenger car; however, vehicle 12 could also be a truck, sports utility vehicle (SUV), recreational vehicle, bus, train, marine vessel, aircraft, or the like that includes the communication system 10. Vehicle 12 may be operated in any one of a number of autonomous modes. As discussed above, vehicle 12—in some examples—may operate as an autonomous ride-share vehicle, taxi vehicle or the like—e.g., operating in a fully autonomous mode (e.g., a level 5), as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention.

Figure 2:
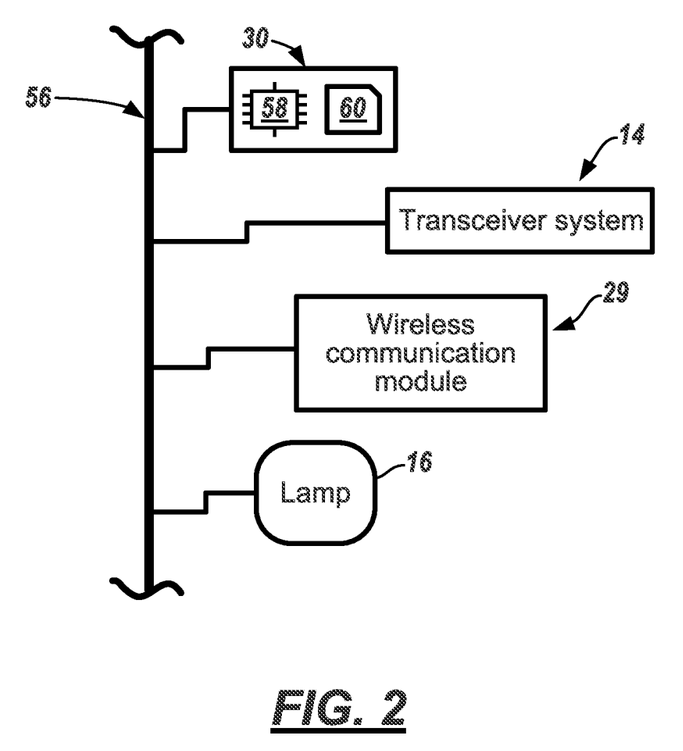
FIG. 2 is a schematic diagram of a network connection of a plurality of electronic devices on the vehicle.

Vehicle 12 may comprise the wireless transceiver system 14, the indicator 16, a wireless communication module 29, and an onboard computer 30 for controlling the system 14 and indicator 16. According to one example, the transceiver system 14 and indicator 16 may be coupled to a roof 32 of vehicle 12; however, this is merely an example and is not required. As will be explained in greater detail below, the transceiver system 14 and indicator 16 each may be used in line-of-sight (LOS) applications; consequently, an elevated position—e.g., such as on the vehicle roof 32—may facilitate LOS implementations of data between the respective electronics and a user-wearable device such as device 20.

Figure 3:
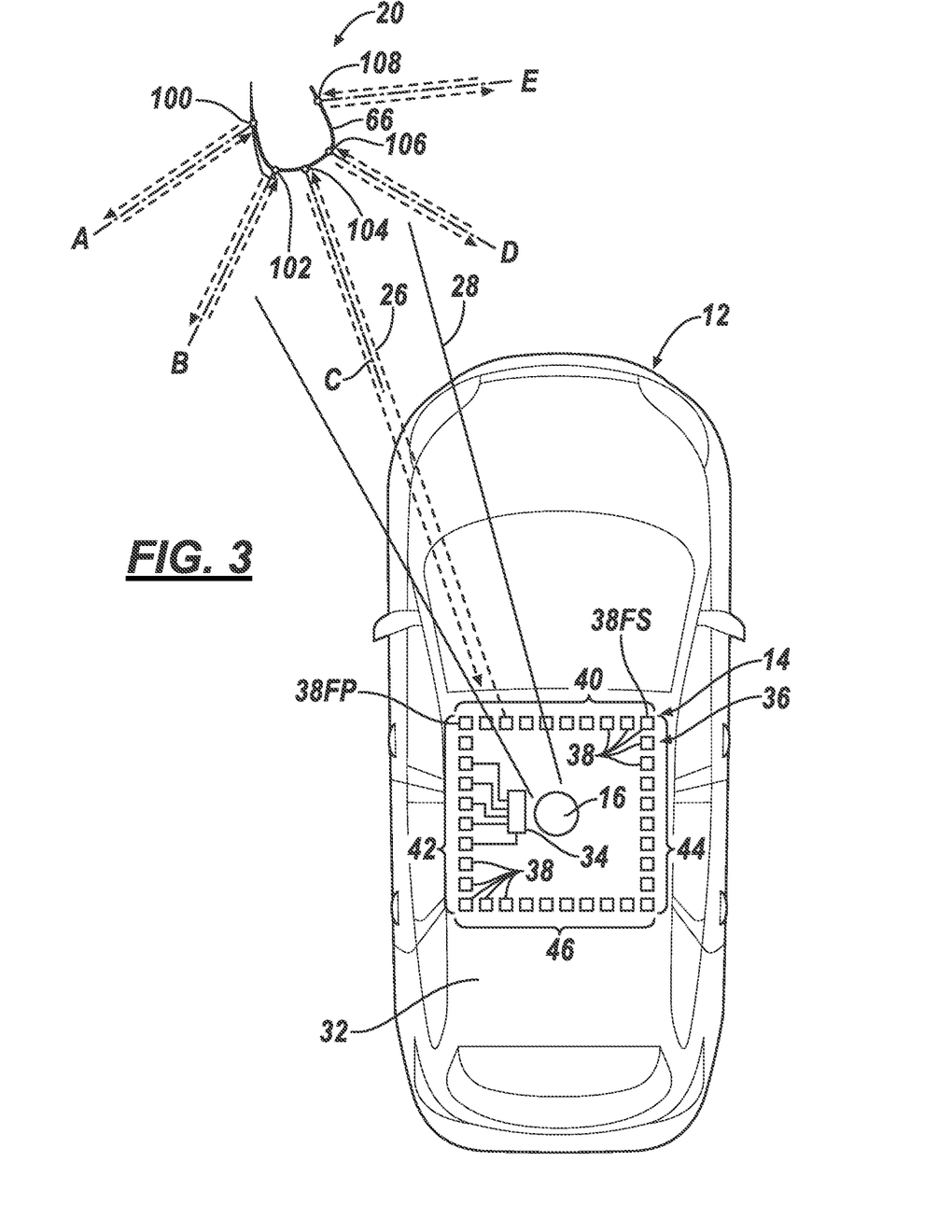
FIG. 3 is another schematic diagram of the vehicle, illustrating wireless communication between the transceiver system and the wearable device.

In at least some examples, transceiver system 14 may comprise a hub circuit 34 coupled to an array 36 of transceiver elements 38. Hub circuit 34 could comprise a multiplexer (not shown) or other circuit elements (not shown) which may be in communication with computer 30.

The array 36 may comprise a plurality 40 of vehicle-forward-facing elements 38, a plurality 42 of vehicle-port-side-facing elements 38, and a plurality 44 of vehicle-starboard-side-facing elements 38. FIG. 3 illustrates a rectangular arrangement; however, this is merely an example. Other arrangements of array 36 exist—e.g., including elliptical, hexagonal, trapezoidal, etc. arrangements, just to name a few. The forward-facing, port-side-facing, and starboard-side-facing elements 38 broadcast wireless transmissions radially-outwardly (to wearable devices 20) and receive wireless transmissions radially-inwardly (from wearable devices 20), and this may occur as the vehicle 12 moves from location to location. According to at least one example, a plurality 46 of vehicle-rearward-facing elements 38 may be used as well (e.g., so that the array 36 may communicate with wearable devices 20 behind vehicle 12 or devices 20 which vehicle 12 has already passed).

In one example (FIG. 4), each transceiver element 38 includes a chipset 50 and a two-way antenna 52. The chipset 50 may comprise any suitable electronic device that is configured to transmit and receive wireless data within a preconfigured bandwidth. According to one non-limiting example, chipset 50 is configured, adapted, arranged, etc. for operation in the so-called V-band (e.g., 57-71 GigaHertz (GHz)); and in one particular application, the chipset 50 transmits and receives in the 60 GHz band (e.g., 60 GHz, +/−1 GHz).

Figure 4:
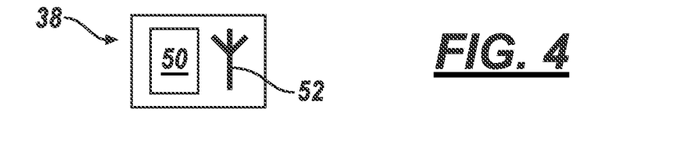
FIGS. 4-5 illustrate two non-limiting examples of transceiver elements on the vehicle.
Figure 5:
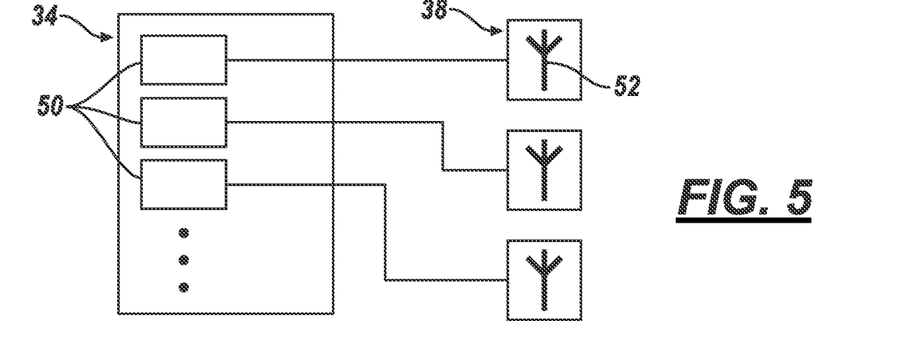

Antenna 52 may be any suitable antenna device which operates in a band that corresponds with the chipset 50 to which it is coupled and matched. Each antenna 52 may be configured to have a relatively narrow lobe or beam. For example, using beamsteering techniques, each antenna 52 may have a beam comprising central axis extending radially outwardly of the vehicle 12 from the antenna's respective position in the array 36. One example of such a beam is illustrated as target beam 26, which will be described in greater detail below. The beams of each antenna 52 may diverge and/or the overlap of the beams of the adjacently-located antennas 52; further, the antennas 52 may be configured so that overlap occurs at a predetermined distance from vehicle 12. For instance, one non-limiting example of beam overlap of two adjacent antennas 52 could occur at distances of at least 20 yards (e.g., measured from the pair of transceiver elements 38).

In at least some examples, corner transceiver elements 38-FS, 38FP may be steered in at least two different directions. For example, element 38FS could be both steered vehicle-forwardly and vehicle-starboardly (and/or a combination thereof), and element 38FP could be steered both vehicle-forwardly and vehicle-portly (and/or a combination thereof).

In other implementations (FIG. 5), the chipsets 50 of the respective transceiver elements 38 can be located in the hub circuit 34, and each of the transceiver elements 38 in the array 36 could comprise an antenna 52 (or only antenna 52). In this manner, this dimensions of the array 36 may be minimized.

Turning now to indicator 16 on vehicle 12, as used herein, an indicator is an electronic device which emits electromagnetic energy or acoustic energy (e.g., including but not limited to visible light (e.g., 390 nanometers (nm) to 700 nm) and/or audible sound (e.g., 20 Hertz to 20 kiloHertz)). In at least one example, the indicator 16 is a multi-function lamp which emits an alert (e.g., visible light according to a light pattern 28 which may include one or more colors); however, as explained below, other alert examples exist which may or may not include using a lamp. Thus, according to at least one example, indicator 16 comprises one or more light sources (not shown; such as light-emitting diodes) which emit light radially-outwardly from a center thereof. The light source(s) selectively may be controlled to emit different colors and to flash at different rates. Further, the emitted light may have any suitable shape. For instance, lamp 16 may emit a planar beam extending radially-outwardly in all directions (or an angular portion thereof). In other example, the light may be a beam having any suitable shape.

As will be explained more below, the computer 30 may control the light emission according to a predetermined light pattern 28—e.g., the light pattern 28 being determined (prior to emission) by user 22, wearable device 20, vehicle computer 30, or even backend server 24. For example, the pattern 28 may include a multiple-part sequence. For purposes of illustration only and not to be limiting, indicator 16 initially may emit a first color for a first time interval, followed by emitting another color (different than the first) for a duration of the first time interval, followed by emitting yet another color (different than the first and second) for the duration of the first time interval, and followed by a pause (no light emission) according to a multiplier of the duration of the first time interval. Thereafter, the sequence may repeat. For example, at least some of the emissions may comprise the same color, at least some of the emissions may comprise different colors, at least some of the emissions may have different time intervals, and/or a combination of these characteristics may be used instead. Further, the quantity of flashes, colors, or intervals may vary. Just to illustrate a few examples, the pattern 28 may include: (a) a flash of red light for one second, a flash of green light for one second, a flash of blue light for one second, a pause for one second, and then repeat the sequence, (b) a flash of red light for one second, a flash of blue light for one second, a flash of red light for three seconds, and a pause for one second (then repeat the sequence), or (c) an orange light flashed on and off at a 50% duty cycle for two seconds followed by a yellow light flashed on and off at a 50% duty cycle for two seconds (then repeat the sequence).

As will be explained below, operation of the indicator 16 may notify the user 22 that the vehicle 12 is his/her requested ride-share vehicle. As used herein, a user is a human being. And according to one example, when the user 22 observes an alert from vehicle 12 (e.g., light pattern 28), the user 22 may identify the vehicle 12 by comparing it with a corresponding light pattern (e.g., displayed on the wearable device 20), as explained below.

In other examples, the indicator 16 may emit audible indications (or light combined with audible indications). Thus, in at least one example, the indicator 16 may comprise an amplifier circuit, a loudspeaker, etc. Or the indicator 16 may comprise a display which outputs text using light or backlighting (e.g., an alphanumeric code, symbol, combination thereof, etc.). Thus, the user 22 may see the text and compare it to text displayed via the wearable device 20.

Wireless communication module 29 may be any suitable telematics computing device configured to wirelessly communicate with other electronic devices, including backend server 24. Such wireless communication may include use of cellular technology (e.g., LTE, GSM, CDMA, and/or other cellular communication protocols), short range wireless communication technology (e.g., using Wi-Fi, Bluetooth, Bluetooth Low Energy (BLE), dedicated short range communication (DSRC), and/or other short range wireless communication protocols), or a combination thereof. Such communication includes so-called vehicle-to-vehicle (V2V) and vehicle-to-infrastructure (V2I) communications as well—all of which will be appreciated by those skilled in the art. For example, module 29 may include one or more embedded wireless chipsets and/or may facilitate cellular communication using the cellular chipset of a mobile device (not shown) carried by a user 22 of vehicle 12 (e.g., such as a cellular phone, Smart phone, etc.). Module 29 may be programmed to receive (e.g., from server 24) a wireless transmission instruction that includes a ride-share request, the location (e.g., GPS coordinates of the user 22 requesting a ride), and characteristics of indication data (e.g., a requested light pattern 28 or other indication to the user 22 that the vehicle 12 is his/her requested vehicle).

Wireless transceiver system 14, indicator 16, wireless communication module 29, and computer 30 may be coupled communicatively to one another via a network connection 56. As discussed briefly above, computer 30 may control, among other things, the operation of the transceiver system 14 and indicator 16. In general, computer 30 may comprise one or more computing devices—e.g., computer 30 may be a dedicated device or may be shared with other vehicle systems and/or subsystems.

Computer 30 may comprise a processor 58 coupled to memory 60. Processor 58 can be any type of device capable of processing electronic instructions, non-limiting examples including a microprocessor, a microcontroller or controller, an application specific integrated circuit (ASIC), etc.—just to name a few. Using processor 58, computer 30 may be programmed to execute digitally-stored instructions, which may be stored in memory 60, which enable the computer 30, among other things, to: receive at array 36 a ride-share request from wearable device 20, wherein the request may include alert format data such as a predetermined light pattern to be used to provide an indication to the user 22 that the vehicle 12 is the requested ride-share vehicle; using the array 36, determine an angle of arrival of the request from the wearable device 20; and, by controlling indicator 16, transmit an alert toward the wearable device 20 according to the format data.

Memory 60 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 60 may store one or more computer program products which may be embodied as software, firmware, or the like.

Network connection 56 may include any suitable hardware to facilitate wired or wireless intra-vehicle communication between electronic devices such as transceiver system 14, indicator 16, wireless communication module 29, computer 30, and the like. In at least one example, the connection 56 includes one or more of a controller area network (CAN) bus, Ethernet, Local Interconnect Network (LIN), a fiber optic connection, or the like. Other examples also exist. For example, alternatively or in combination with e.g., a CAN bus, connection 56 could comprise one or more discrete wired or wireless connections (e.g., between the computer 30 and indicator 16 and/or transceiver system 14).

Turning now to the wearable device 20 (FIGS. 3, 6-8), as used herein, a wearable device 20 includes an electronics device (comprising a wireless transceiver element), wherein, by design, the wearable device 20 includes a carrier or housing 66 (of the electronics device) that is intended to be coupled to a portion of the user's body 68 so that the user 22 does not have to use his/her hand(s) to hold or grip the wearable device. Consequently, non-limiting examples of carrier 66 include a hat having a wireless transceiver element, a helmet having a wireless transceiver element, a pair of eyeglasses having a wireless transceiver element, a headband having a wireless transceiver element, a wristband having a wireless transceiver element, just to name a few.

Figure 6:
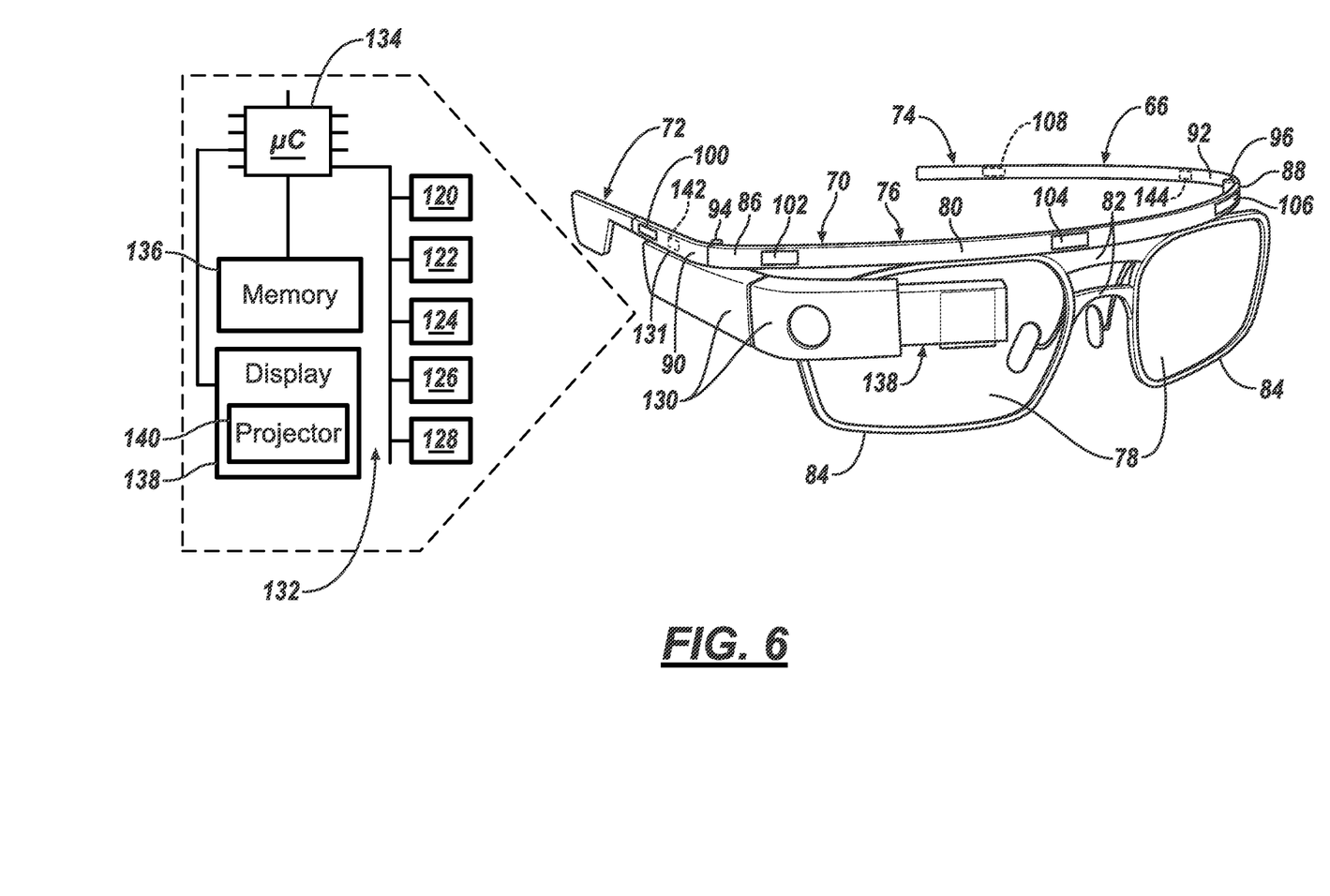
FIG. 6 illustrates a perspective view of an exemplary wearable device and a schematic view of an electronics module of the device.

For purposes of illustration only, the carrier 66 is shown as a pair of eyeglasses in the illustrations. In this example, carrier 66 may comprise a frame 70 having a right temple piece 72, a left temple piece 74, and a front member 76 for supporting a pair of lenses 78. The front member 76 may comprise a brow portion 80 and a bridge 82, and in some examples, the front member 76 may include a pair of rims 84 for further supporting the lenses 78—e.g., being coupled to one another via the bridge 82. At opposite lateral ends 86, 88 of the front member 76, respective ends 90, 92 of the right and left temple pieces 72, 74 may be coupled by respective hinges 94, 96.

Figure 8:
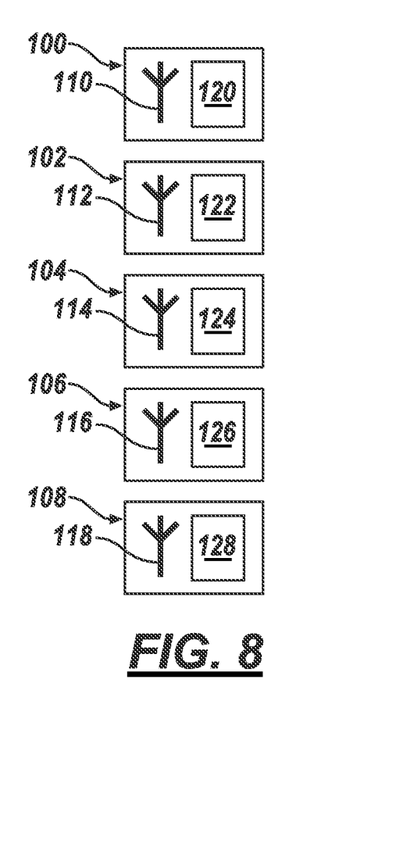

According to at least the illustrated example, the wearable device 20 may comprise multiple wireless transceiver elements 100, 102, 104, 106, 108 (e.g., although only one is required). Like the transceiver elements (38) described above (on vehicle 12), the transceiver elements 100-108 may comprise respective antennas 110, 112, 114, 116, 118 (FIG. 7), or both respective antennas 110-118 and respective wireless chipsets 120, 122, 124, 126, 128 (FIG. 8). In instances where the transceiver elements 100-108 do not include chipsets 120-128, these chipsets may be located in an electronics module 130 (as shown in FIG. 6), which is described more below.

Figure 6A:
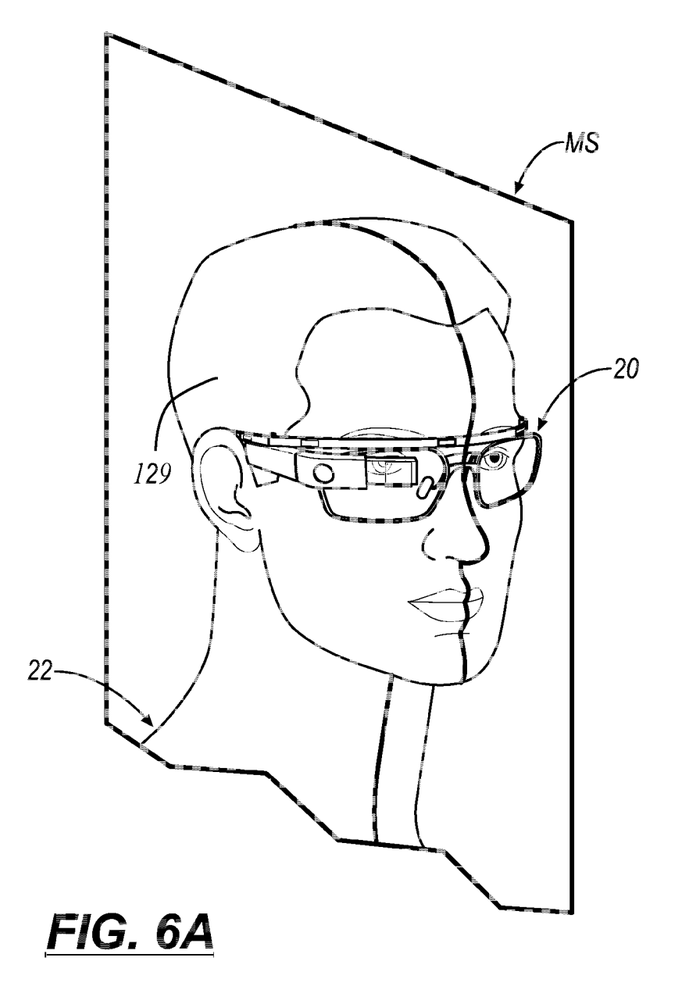
FIG. 6A illustrates a perspective view of a head of a user wearing the wearable device.
Figure 7:
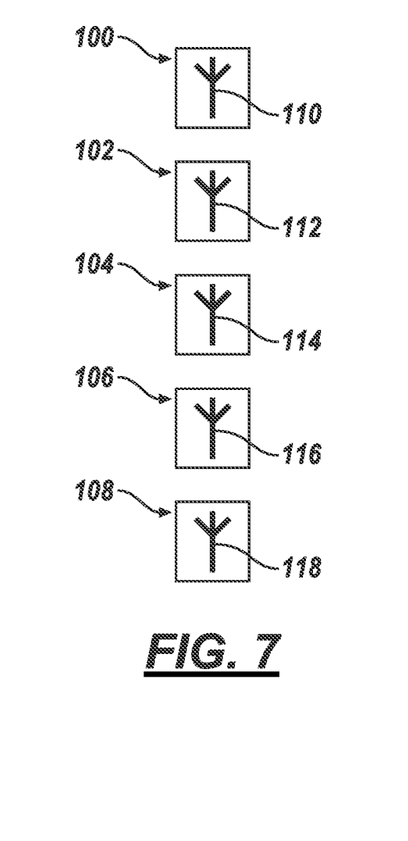
FIGS. 7-8 illustrate two non-limiting examples of transceiver elements on the wearable device.

According to the illustrated arrangement, element 100 may be coupled to the right temple piece 72, the elements 102-106 may be coupled to the front member 76, and element 108 may be coupled to the left temple piece 74. In at least one example, one of the elements (e.g., 104) is a central (or centrally-located) transceiver element—e.g., when the device 20 is worn by user 22, the central element 104 may be located along a so-called mid-sagittal plane MS of the user's head 129 (e.g., see FIG. 6A). As will be explained in greater detail below, the correspondence between central element 104 and the midsagittal plane MS of the user's head 129 may be used to determine whether the user 22 is facing an oncoming ride-share vehicle 12. Elements 100-108 may be equidistantly and/or laterally spaced from one another about a (e.g., curvilinear and/or angular) length formed by the right temple piece 72, the front member 76, and the left temple piece 74. Each element 100-108 may be configured to transmit and receive; further, each element may have an axis (A, B, C, D, E, respectively) of transmission and/or reception, wherein each of the axes are oriented at a different relative angle (e.g., relative to a center of the user's head 129). In this manner, circumferential wireless coverage (e.g., 360$d$) or at least partially circumferential wireless coverage may be obtained. Other spacing arrangements and/or quantities of elements 100-108 may be used in other examples.

The electronics module 130 may be coupled to any suitable portion of the frame 70; e.g., in FIG. 6 it is coupled to a bottom surface 131 the right temple piece 72 and extends beyond end 90 thereof (as well forwardly of front member 76). The module 130 comprises a computer 132 that includes a processor 134 and memory 136 and a display 138. According to one example, processor 134 is a microprocessor; however, it could also be any other suitable device configured to process electronic instructions—e.g., including but not limited to a microcontroller or an application specific integrated circuit (ASIC). Memory 136 may be any suitable non-transitory computer usable or readable medium—e.g., including one or more types of the exemplary memory devices listed above (e.g., described with respect to memory 60)—e.g., according to at least one example, memory 136 includes RAM, ROM, and EPROM; however, this is merely an example.

Memory 136 stores instructions executable by the processor 134 enabling the processor 134 to carry out at least a portion of one or more processes, described in detail below. Non-limiting examples of at least some of the executable instructions include: transmitting a ride-share request from one or more of the elements 100-108; receiving a target beam 26, via at least one of the elements 100-108—indicating that vehicle 12 is available for ride-share usage; determining an angle of arrival of the target beam 26 (e.g., based on received signal strength of at least one of the spaced elements 100-108); providing a visual, audible, and/or tactile indication to the user 22 regarding which direction the vehicle 12 is relative to user 22; transmitting alert format data to the vehicle 12; providing an indication to the user 22, via wearable device 20, that the user 22 is facing the vehicle 12 so that the user 22 may identify the vehicle 12; providing the indication that includes displaying the indication via display 138, wherein the indication is in the form of a preconfigured light pattern so that the user 22 may compare the displayed light pattern to an alert sent from vehicle 12 (e.g., in the form of light pattern 28); a combination of any of the above listed instructions; etc.

Display 138 may be any suitable electronic digital or analog display including but not limited to light-emitting diode (LED) displays and liquid crystal displays (LCDs). In hat, helmet, headband, and/or eyeglass implementations, the display 138 may be a so-called head-up display. According to one example, display 138 includes a projector 140 that projects images onto the user's retina (e.g., one commercially available example of the projector 140 is employed on Google Glass™).

The wearable device 20 may comprise other components in some examples. For instance, the device 20 may have a pair of tactile-indicators 142, 144 respectively located temple pieces 72, 74. The tactile-indicators 142, 144 may be coupled to computer 132 and, when actuated thereby, may vibrate or provide an impulse to the user's body 68 (e.g., head 129). As will be described more below, computer 132 selectively may actuate one of these indicators 142, 144 to provide an indication to the user 22 which direction to turn his or her head 129 to look for the alert sent by vehicle 12.

Other examples of communication system 10 also exist. In at least one example, the wearable device 20 may be located on other portions of the user's body 68. For example, the wearable device 20 may be worn using a wrist-strap, an arm band, a chest strap, or a leg band, just to name a few examples.

Turning now to remote server 24, server 24 may comprise any suitable computer or computing system having one or more processors and memory which may be linked to one or more computer databases—the server 24 may be specially-configured to communicate with vehicles operating in an autonomous mode, e.g., such as vehicle 12. For example, server 24 may perform a number of backend functions for vehicles operating as autonomous vehicle taxis, autonomous vehicle school buses, etc. Non-limiting examples of backend functions including providing pick-up locations (and destination data) of users 22, providing routing and/or destination data for vehicle 12, providing infotainment and/or entertainment services, providing emergency services, etc. In at least one example, as will be explained more below, server 24 can receive an instruction from user 22 (e.g., via wearable device 20 and/or a mobile device (e.g., such as a Smartphone)), and the instruction may include a ride-share request. In at least some examples, the ride-share request may include user location information, user destination information, and/or alert format data (e.g., designating in what manner the user 22 wishes to the vehicle 12 to identify itself). Additional instructions stored and executable at server 24 may include transmitting at least some of the ride-share request information to an appropriate vehicle 12 (e.g., determining the vehicle 12 from among a fleet of vehicles). Further, providing this information may include providing the alert format data to vehicle 12 so that the vehicle—when it has line-of-sight (LOS) with wearable device 20—can provide an appropriately-configured alert. These are merely some examples; other executable instructions are also possible.

FIG. 1 also illustrates a communication network 150 which may comprise a land communication network, a wireless communication network, or both. The land communication network can enable connectivity to public switched telephone network (PSTN) such as that used to provide hardwired telephony, packet-switched data communications, internet infrastructure, and the like. A wireless communication network may include satellite communication architecture and/or may include cellular telephone communication architecture over wide geographic region(s). Thus, in at least one example, network 150 includes any suitable cellular infrastructure that could include eNodeBs, serving gateways, base station transceivers, and the like. Further, network 150 may utilize any suitable existing or future cellular technology (e.g., including LTE, CDMA, GSM, etc.). Land and wireless communication networks are generally known in the art and will not be described further herein. In at least one example, the remote server 24, the vehicle 12, and/or the user 22 (e.g., via the wearable device 20 and/or a mobile device such as a cellular telephone or Smartphone) may be connected to one another via the communication network 150.

Figure 9:
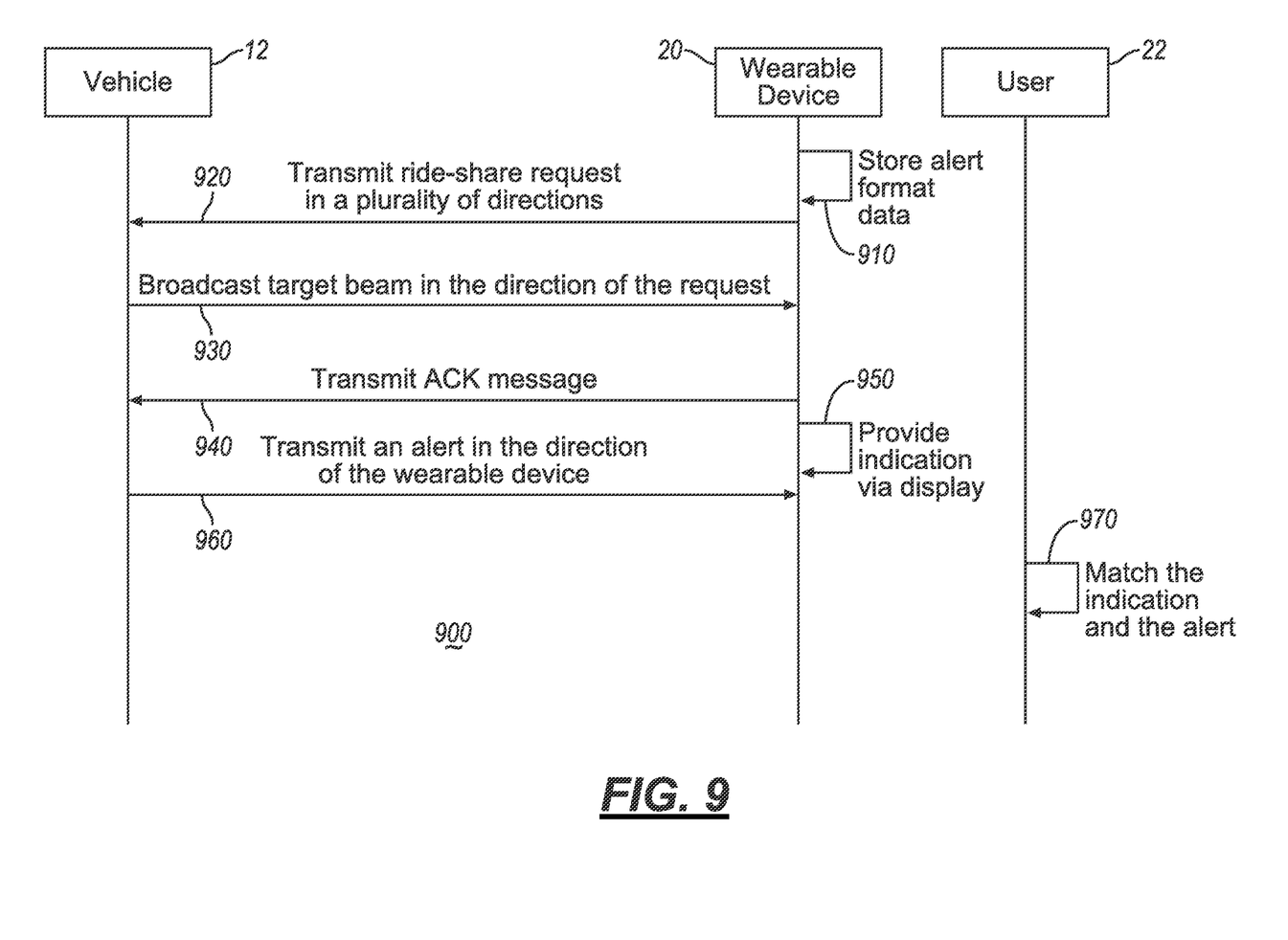
FIGS. 9-11 illustrate exemplary flow diagrams of processes of using the communication system described herein.
Figure 10:
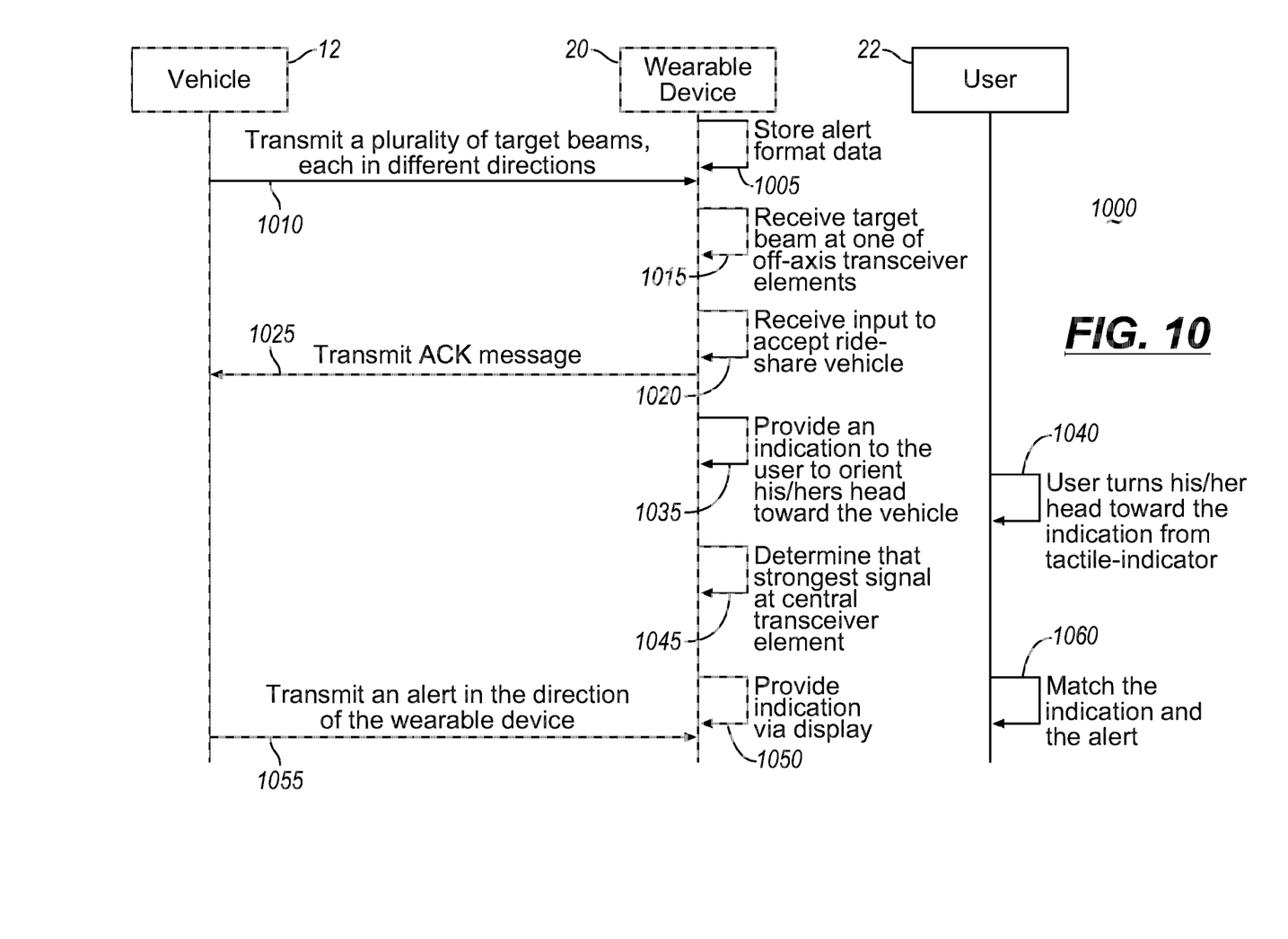
Figure 11:
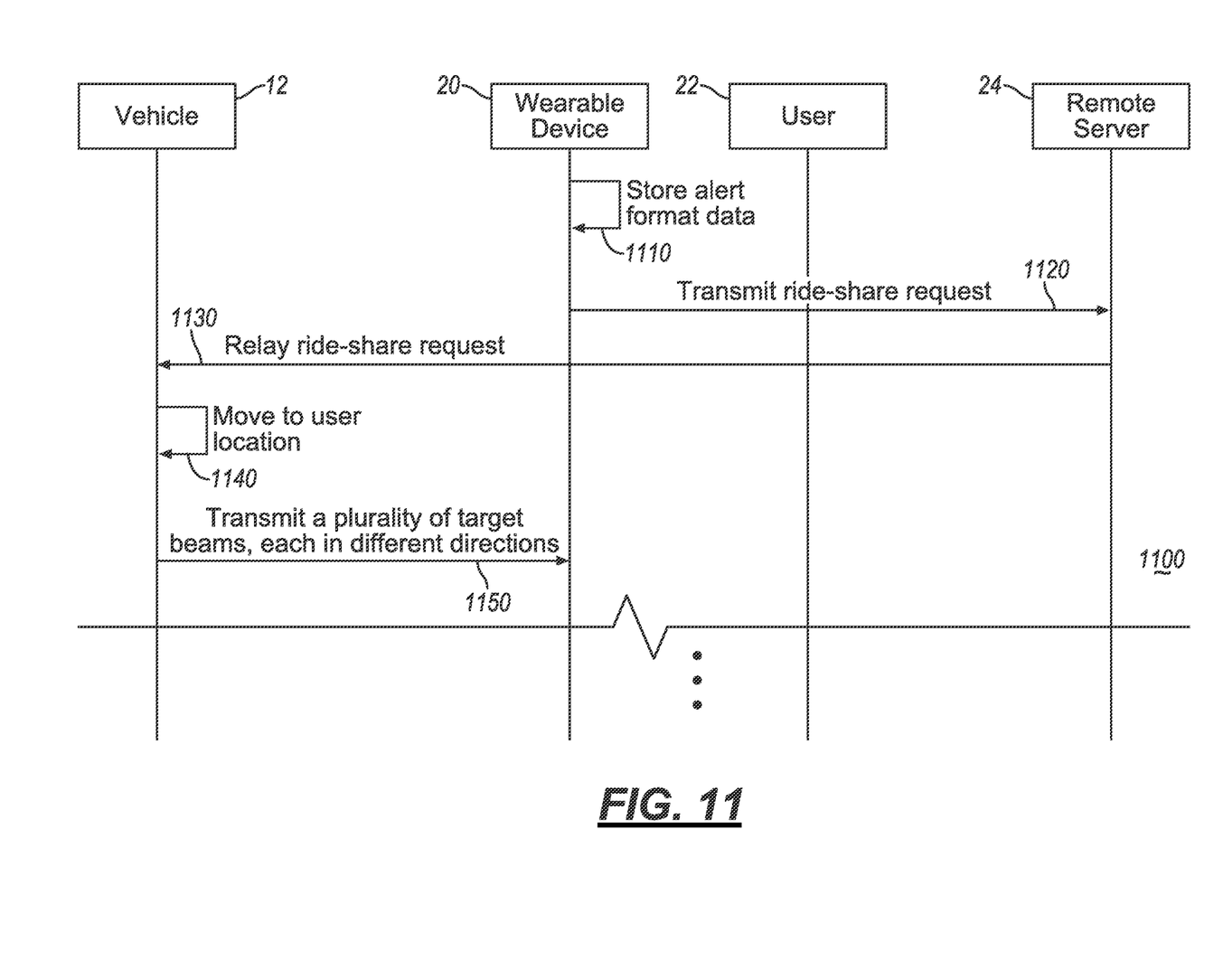

Turning now to FIGS. 9-11, there are shown several examples of processes 900, 1000, 1100 which may be executed by the computer 132 of the wearable device 20 and/or the vehicle computer 30. For purposes of illustration only, the wearable device 20 used in the illustrated processes 900, 1000, 1100 is the device shown in FIG. 6 which comprises the eyeglasses frame 70, the transceiver elements 100-108, and electronics module 130. Further, at least some of the instructions described in process 900 may be used together with instructions of process 1000 and/or 1100; similarly, at least some of the instructions of process 1000 may be used together with instructions from process 900 and/or 1100; and still further, at least some of the instructions of process 1100 may be used together with instructions from process 900 and/or 1000.

According to the exemplary process 900 (FIG. 9), the process may begin with instruction 910 wherein the memory 136 stores alert format data. This alert format data may take a variety of forms, as discussed above. For instance, according to at least one example, the data may comprise at least one predetermined light pattern which may be executed by the indicator 16 on vehicle 12. In some instances, this light pattern may be created by user 22, selected by user 22 (e.g., from a list of preconfigured alerts), or the like.

Instruction 920 may comprise sending a ride-share request in a plurality of directions. For example, according to one example, the wearable device 20 may transmit a ride-share request via transceiver elements 100-108. In one example, these transmissions are sent via a 60 GHz band in along each of axes A, B, C, D, E. Transmissions in the 60 GHz band may have a limited range. For example, 60 GHz transmissions are absorbed relatively quickly by oxygen within the atmosphere. Such short-range transmissions are less likely to be intercepted (e.g., thus, according to one aspect, they may facilitate greater information security). Further, due to high atmospheric absorption, these signals typically experience less interference with one another or other wireless signals making them suitable for line-of-sight applications. In at least one example, where the user 22 is seeking a ride-share opportunity, the wearable device 20 transmits a line-of-sight ride-share request via each of transceiver element(s) 100-108 (e.g., in multiple directions).

Next, vehicle 12 may receive at least one of the transmissions. For example, the vehicle 12 may be within a non-attenuation range of wearable device 20 and also may be within a line-of-sight (LOS) thereof. Due to the narrow beamformed transmissions from device 20, the ride-share request may be received wirelessly at only a portion of the transceiver elements 38 of vehicle array 36 (according to one example, received at one to five transceiver elements 38). Using received signal strength indications (RSSI) techniques, the vehicle computer 30 may determine an angle of arrival of the wearable device transmission. For example, if the user 22 wearing the wearable device 20 is located in front of vehicle 12, the computer 30 may identify one transceiver element 38 in which the signal strength is strongest—e.g., from among the plurality 40 of vehicle-forward-facing elements 38. An axis that corresponds to that transceiver element may be determined by computer 30 to be aligned with the wearable device 20. Accordingly, the adjacent transceiver elements 38 (e.g., on either side of this one transceiver) may have a correspondingly smaller signal strength measurements—e.g., further indicating alignment with a transceiver element 38 located therebetween. Using this information, computer 30 may execute an instruction 930 to broadcast a target beam 26 in the direction of the request (e.g., along an axis of the transceiver element 38 having the strongest received signal strength).

In at least one example, the wearable device 20 may receive the target beam 26 via the central transceiver element 104. In response to receiving the target beam 26 at element 104, the computer 132 may determine that the user's head 129 is facing in the direction of the vehicle 12. Further, in response to receiving the target beam 26, the wearable device 20 may send an acknowledge (ACK) message to the vehicle 12 (e.g., via element 104) (instruction 940). This message may indicate to the vehicle 12 that the wearable device 20 not only received the target beam 26, but also that the user 22 desires ride-share services from the particular vehicle 12. In at least one example, the ACK message further includes alert format data (e.g., such as that stored in memory 136, see instruction 910). Using this data, vehicle 12 may alert the user 22 of the vehicle's presence. For instance, the wearable device 20 may have located vehicle 12 (or the direction of its approach); however, the user 22 may not yet identify vehicle 12 or its LOS location, and the alert may provide verification to the user 22.

In instruction 950, wearable device 20 may provide an indication to the user of the anticipated alert (e.g., in response to receiving the target beam 26). According to one non-limiting example, the display 138 of the device 20 provides a visual preview of the alert to be sent from the vehicle 12. For instance, the device 20 may display, via a heads-up display 138 to user 22, the light pattern stored as alert format data. In at least one example, the display 138 uses projector 140 to project the indication (e.g., light pattern) onto a retina of the user's eye so that the user 22 not only sees the projected image, but also can see the vehicle 12 emit a similar alert with that eye.

In instruction 960, the vehicle 12 transmits the alert in the direction of the wearable device 20. As discussed above, this alert (e.g., a light pattern) may be identical to that displayed to user 22. Consequently, the user 22 may match the indication with the alert and identify the vehicle 12 (970)—e.g., even before the vehicle 12 arrives at the pick-up location or stops near user 22. For example, the user may match the projected light pattern (e.g., from display 138) with the alert emitted from indicator 16 on vehicle 12. In at least one example, the vehicle 12 provides the alert concurrently while the array 36 transmits the target beam 26 in the wearable device's direction.

In at least some examples, the display 138 may provide the indication of the vehicle's presence to the user 22 only when the user's head 129 is facing vehicle 12. For example, if the user 22 turns his or her head 129, the display 138 may cease providing the indication. Computer 132 may determine that the user's head no longer faces the vehicle 12 because, when the user's head 129 faces the vehicle, the central transceiver element (e.g., 104) may have the strongest signal from vehicle 12, and computer 132 may presume that axis C (associated with element 104) is coincident with the user's mid-sagittal plane MS; therefore, the user 22 is presumed to be facing the vehicle 12.

According to the exemplary process 1000 (FIG. 10), the process may begin with instruction 1005 which may be similar or identical to instruction 910 (storing alert format data in memory 136). Therefore, this instruction will not be described in greater detail here.

Next, instruction 1010 may be executed by computer 30 by vehicle 12 broadcasting a plurality of target beams (e.g., like beam 26) each in a different direction. For example, in process 1000, the computer 30 of vehicle 12 may be unaware of the presence of a user 22 who desires ride-share services. Thus, the vehicle 12 advertises its proximity and availability via the broadcast instruction 1010.

Next, wearable device 20—worn by user 22—receives one of the target beams at one of the off-axis transceiver elements 100, 102, 106, 108 (i.e., those not coincident with the mid-sagittal plane MS) (instruction 1015). For illustrative purposes, consider the target beam 26 being received at element 100.

The target beam 26 may carry data—e.g., including an invitation to ride-share in vehicle 12. Thus, instruction 1020 (at wearable device 20) includes receiving an input (e.g., from user 22) to accept the ride-share invitation. This may be carried out in a variety of ways including using a human machine interface (HMI) with respect to device 20 (e.g., a pushbutton on the device 20, a voice-control feature of device 20, a Bluetooth interface between a Smartphone and the device 20, wherein the user 22 enters input via the Smartphone which then is provided to the device 20, etc.).

Once the wearable device 20 determines that the ride-share invitation will be accepted, the device may transmit an ACK message to the vehicle 12 (instruction 1025). This message may be identical or similar to the message described in instruction 940; therefore, it will not be re-described herein.

Once instruction 1020 is executed, the computer 132 may provide an indication to the user 22 to orient the user's head 129 toward the vehicle 12 (instruction 1035). Continuing with the example above (e.g., wherein the target beam 26 is striking the right side of the user's head 129 (e.g., as computer 132 determines this based on signal strength at transceiver element 100)), computer 132 actuates tactile-indicator 142 (e.g., causing a vibration on the right side of the user's head 129). This actuation may prompt or cause the user 22 to turn his or her head 129 toward the vibratory sensation (instruction 1040). If computer 132 then determines that transceiver element 104 is receiving the strongest signal (instruction 1045), the process 1000 may proceed to instruction 1050. If for example, computer 132 determines that the target beam 26 is now being received with the strongest signal at transceiver element 102, then the computer 132 may re-actuate the tactile-indicator 142 causing the user's head 129 further to turn right-ward. Or for example, if the computer 132 determines that the target beam 26 is now being received with the strongest signal at transceiver element 106 or 108, then the computer 132 may actuate the tactile-indicator 144 to prompt the user's head 129 to turn left-ward. Instruction 1035 may recur until the mid-sagittal plane MS of the user's head 129 faces an origin of the target beam 26.

In instruction 1050, wearable device 20 may provide an indication to the user 22 of the nature of the alert to be provided via vehicle 12; this instruction may be similar or identical to instruction 950; therefore, it will not be re-described here. Similarly, in instruction 1055, the vehicle computer 30 transmits, via indicator 16, the alert. This may be similar or identical to instruction 960; therefore, it will not be re-described here. Lastly, the user 22 may determine whether the indication provided via display 138 and the alert sent from vehicle 12 match (instruction 1060); this may be similar or identical to instruction 970 (previously described); thus, instruction 1060 will be not be described in greater detail.

According to the exemplary process 1100 (FIG. 11), the process may begin with instruction 1110 which may be similar or identical to instruction 910 (storing alert format data in memory 136). Therefore, this instruction will not be described in greater detail here.

Following instruction 1110, the wearable device 20 (or other suitable device which may or may not be connected to device 20) may transmit a ride-share request to the remote server 24 (instruction 1120). For instance, in at least one example, the user 22 may use his/her Smartphone to send the request. In at least one example, the request includes alert format data so that the server 24 may convey the type and nature of the user's desired alert to the vehicle 12. The request also may include the user's location and desired destination.

Thereafter, server 24 may determine from a fleet of vehicles which vehicle is appropriate to respond to the user's ride-share request. The server 24 may assess the location of the user 22, his/her desired destination, the number of vehicles proximate to user 22, etc., and the server then may send or relay the user's ride-share request to the appropriate vehicle 12 (instruction 1130).

Vehicle 12 may receive the request from server 24 via the wireless communication module 29. Thereafter, the vehicle 12 may move to the user's location (instruction 1140). For example, computer 30 may instruct the vehicle 12 to operate in a fully autonomous mode and drive to the user's location.

Upon reaching the user's location, the vehicle 12 may transmit a plurality of target beams, each in different directions (instruction 1150). As this instruction may be identical to instruction 1010, instruction 1150 will not be re-described here. Furthermore, in at least one example, process 1100 thereafter may proceed similar to the remainder of process 1000 (e.g., executing some or all of instructions 1015-1060). Thus, these will not be re-described here.

Thus, there has been described a communication system that includes a ride-share vehicle having a wireless transceiver system and an indicator, as well as a wearable device that is configured to communicate with the transceiver system. The communication system may be used to assist a user-wearing the wearable device—in identifying the ride-share vehicle. The wireless transceiver system and wearable device may communicate via line-of-sight; further, the signals therebetween may be used to determine an angle of arrival by either device. The wearable device may be configured so that when the user is facing the vehicle, the wearable device provides an indication to the user so that the user may identify the appropriate vehicle.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method, comprising:
   receiving, at a first transceiver element of a wearable device, a target beam from a ride-share vehicle, the element having a first axis of reception; and
   when the first axis is oriented toward the beam, providing an indication, via a computer in the wearable device, to a user thereof;
   wherein:
      the wearable device further comprises an eyeglass frame carrying the first transceiver element and the computer;
      the first axis corresponds with a mid-sagittal plane of the user's head; and
      the first transceiver element operates in a V-band between 57 GHz and 71 GHz.

2. The method of claim 1, wherein the indication includes a light pattern that matches a light pattern emitted from the vehicle.

3. The method of claim 1, further comprising: prior to receiving the target beam, transmitting, from the transceiver, a ride-share request.

4. The method of claim 1, further comprising:
   receiving the target beam via a second transceiver element of the device, wherein the second transceiver element comprises a second, different axis of reception; and
   providing to the user a second indication which indicates a direction from which the target beam originates.

5. A system, comprising:
   a wearable device, comprising:
      a first transceiver element having a first axis of reception; and
      a computer, comprising a processor and memory storing instructions executable by the processor, including to:
         receive, via the first transceiver element, a target beam from a ride-share vehicle; and
         when the first axis is oriented toward the beam, provide an indication via the device to a user thereof;
   wherein:
      the wearable device further comprises an eyeglass frame carrying the first transceiver element and the computer;
      the first axis corresponds with a mid-sagittal plane of the user's head; and
      the first transceiver element operates in a V-band between 57 GHz and 71 GHz.

6. The system of claim 5, wherein the device further comprises a projector which projects the indication toward an eye of the user.

7. The system of claim 5, wherein the indication includes a light pattern provided by the device which matches a light pattern emitted from the vehicle.

8. The system of claim 5, wherein the instructions further comprise to: transmit a ride-share request, wherein receiving the target beam occurs in response to transmitting the request.

9. The system of claim 8, wherein the instructions further comprise to: transmit alert format data to the vehicle so that, using the data, the vehicle may identify itself to the user.

10. The system of claim 5, wherein the device comprises: a second transceiver element having a second axis of reception, wherein, with respect to the first transceiver element, the second transceiver element is spaced on the device laterally therefrom.

11. The system of claim 10, wherein the instructions further comprise to:
   receive the target beam via the second transceiver element; and
   using the device, provide to the user thereof, a second indication which indicates to the user a direction from which the target beam originates.

12. The system of claim 11, wherein the instructions further comprise to:
   after providing the second indication, determine when the first axis is oriented toward the beam; and
   in response to the determination, provide the first indication.

13. The system of claim 5, further comprising:
   a computer onboard the vehicle comprising a second processor and second memory storing instructions executable by the second processor, the instructions comprising to:
      receive a ride-share request from the device; and
      provide an alert in a direction from which the ride-share request was received.

14. The system of claim 13, wherein the instructions further comprise to:
- broadcast the target beam from at least one of an array of transceiver elements on the vehicle; and then,
- receive the ride-share request in response to the broadcast.

15. The system of claim 5, further comprising:
- a computer onboard the vehicle comprising a second processor and second memory storing instructions executable by the second processor, the instructions comprising to:
  - receive a ride-share request from a remote server;
  - in a fully autonomous mode and based on the request, move the vehicle to a location of the user; and then,
  - provide an alert in at least one direction radially outwardly of the vehicle.

\* \* \* \* \*